United States Patent
Kim et al.

(10) Patent No.: US 7,308,064 B2
(45) Date of Patent: Dec. 11, 2007

(54) FRAME SYNCHRONIZATION METHOD BASED ON DIFFERENTIAL CORRELATION INFORMATION IN SATELLITE COMMUNICATION SYSTEM

(75) Inventors: Pan-Soo Kim, Daejon (KR); In-Ki Lee, Busan (KR); Tae-Hoon Kim, Seoul (KR); Dae-Ig Chang, Daejon (KR); Deock-Gil Oh, Daejon (KR); Wonjin Sung, Seoul (KR); Deokchang Kang, Seoul (KR); Seokheon Kang, Seoul (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/442,447

(22) Filed: May 26, 2006

(65) Prior Publication Data

US 2007/0133727 A1     Jun. 14, 2007

(30) Foreign Application Priority Data

Dec. 9, 2005     (KR) ...................... 10-2005-0121172

(51) Int. Cl.
*H04L 7/00* (2006.01)
(52) U.S. Cl. ...................................... 375/365; 375/354
(58) Field of Classification Search ................ 375/354, 375/365, 356, 357, 362, 364, 366, 368
See application file for complete search history.

(56) References Cited

U.S. PATENT DOCUMENTS

2003/0031275 A1* 2/2003 Min et al. .................... 375/326
2005/0263238 A1* 12/2005 Takase et al. ............. 156/89.11

(Continued)

FOREIGN PATENT DOCUMENTS

KR    1020000075188 A    12/2000

OTHER PUBLICATIONS

Feng-Wen Sun et al., "Frame synchronization and pilot structure for second generation DVB via satellites", International Journal of Satellite Communications and Networking, Int. J. Satell, Commun. Network, 2004; 22:319-339 (DOE: 10.1002/sat.793) Copyright 2004 John Wiley & Sons, Ltd.

(Continued)

*Primary Examiner*—Chieh M. Fan
*Assistant Examiner*—Jaison Joseph
(74) *Attorney, Agent, or Firm*—Blakely, Sokoloff, Taylor & Zafman

(57) ABSTRACT

Provided is a frame synchronization method for synchronizing frames with pilot blocks added thereto based on differential correlation information in a satellite communication system. The method can acquire a highly reliable frame synchronization estimation value by achieving a multi-step threshold value test using pilot blocks after a correlation analysis and a threshold test based on a sync signal in order to resolve the problem of a low signal-to-noise ratio and a large frequency error and acquire highly reliable frame synchronization performance, and can overcome distortion of a correlation analysis value caused by the frequency error by analyzing correlation based on differential information. The method includes the steps of: a) performing correlation analysis and a threshold test by using a sync word; and b) performing a multi-step correlation value test by using the pilot blocks added to the frames prior to the sync word.

6 Claims, 4 Drawing Sheets

U.S. PATENT DOCUMENTS

2006/0209993 A1* 9/2006 Lu .............................. 375/336

OTHER PUBLICATIONS

Pansoo Kim et al., "Advanced Demodulator Implementation for DVB-S2 System" 2005 Joint Conference on Satellite Communications (JC-SAT 2005), Oct. 13-14, 2005, pp. 101-108, The Institute of Electronics, Information and Communication Engineers, IEICE Technical Report SAT2005-33(Oct. 2005).

* cited by examiner

_US 7,308,064 B2_

FRAME SYNCHRONIZATION METHOD BASED ON DIFFERENTIAL CORRELATION INFORMATION IN SATELLITE COMMUNICATION SYSTEM

FIELD OF THE INVENTION

The present invention relates to a frame synchronization method for synchronizing frames with pilot blocks added thereto based on differential correlation information in a satellite communication system when a signal-to-noise ratio and a large frequency error are low. More particularly, it relates to a frame synchronization method that can estimate highly reliable frame synchronization by using a correlation analysis method which can resolve the problem of frequency error in frame synchronization and performing a multi-step threshold value test based on a frame structure having a pilot added thereto in a satellite communication system.

DESCRIPTION OF RELATED ART

Recent development in channel codes such as LDPC (LDPC) makes it possible to perform communication with a low signal-to-noise ratio (SNR) and a low bit error rate and this also makes a satellite communication system to perform high-quality communication with a high transmission rate.

A Digital Video Broadcasting Satellite Second Generation Standard (DVB-S2), which is a satellite broadcasting system, requires a packet error rate (PER) of about $10^{-7}$ to provide a service in a signal-to-noise ratio smaller than $E_s/N_0 = -2.35$ dB. Also, since the carrier frequency usually used in satellite communication reaches tens of GHz, the bandwidth-to-frequency error is relatively large compared to other systems. To take an example, the frequency error of the DVB-S2 system is between −5 MHz and +5 MHz and this occupies 20% of the bandwidth when the bandwidth is assumed to be 25 MHz. Due to the performance degrading factor in the channel of the satellite communication system, there is a problem in obtaining a desired level of performance when a general frame synchronization method is used.

A general frame synchronization method is revealed by F. W. Sun, Y. Jiang and L. N. Lee in an article "Frame Synchronization and Pilot Structure for Second Generation DVB via Satellite," _International Journal of Satellite Communication Network_, Vol. 22, pp. 319-339, May/June 2004 (Hughes).

According to the Hughes method, correlation analysis is carried out by using differentiation information and the inversion/repetition characteristics of a Physical Layer Signaling Code (PLSC) and a Start Of Frame (SOF) symbol sequence informing the starting point of a frame in the structure of the DVB-S2 frame. However, when the Hughes method is used for frame synchronization, it is difficult to acquire high-quality performance which is recently required in channels having a low signal-to-noise ratio and a large frequency error in the satellite communication system.

Another frame synchronization method is revealed in Korean Patent No. 10-0396286 entitled "Apparatus and method for generating and transmitting/receiving sync word in asynchronous CDMA communication system," granted to Samsung Electronics Incorporated on Aug. 19, 2003. The frame synchronization method synchronizes frames based on sync signals, stores pilot symbols or a plurality of pilot blocks in a buffer, and verifies the frame synchronization by performing correlation analysis. However, it also has a limitation in acquiring a highly reliable frame synchronization estimation value in a channel having a low signal-to-noise ratio and a large frequency error.

SUMMARY OF THE INVENTION

It is, therefore, an object of the present invention to provide a frame synchronization method that can acquire a highly reliable frame synchronization estimation value by performing a multi-step threshold value test using pilot blocks after a correlation analysis and a threshold test based on a sync signal in order to resolve the problem of a low signal-to-noise ratio and a large frequency error and acquire highly reliable frame synchronization performance, and can overcome distortion of a correlation analysis value caused by the frequency error by analyzing correlation based on differentiation information in a satellite communication system.

Other objects and advantages will be understood clearly by the following description and exemplary embodiments of the present invention. Also, it is apparent to those skilled in the art that the objects and advantages of the present invention can be realized by the means as claimed and combinations thereof.

In accordance with one aspect of the present invention, there is provided a method for synchronizing frames with pilot blocks added thereto based on differential correlation information in a satellite communication system, the method including the steps of: a) performing correlation analysis and a threshold test by using a sync word; and b) performing a multi-step correlation value test by using the pilot blocks added to the frames prior to the sync word.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
FIG. 1 is a diagram illustrating a structure of a burst transmission frame to which the present invention is applied.

FIG. 1 is a diagram illustrating a structure of a burst transmission frame to which the present invention is applied.

Conventional frame synchronization methods based on single correlation analysis have limitation in providing performances required in high-quality broadband services due to signal distortion caused by a low signal-to-noise ratio and a relatively large frequency error of a satellite communication system.

According to the conventional frame synchronization methods, a correlation value of a sync word which indicates the starting point of a frame is calculated as shown in Equation 1 and when the obtained correlation value is larger than a predetermined threshold value, it is determined that the point is a starting point of a frame. Herein, the threshold value is a determined through a Receiver Operation Characteristic (ROC) analysis. When a probability that a correlation value is smaller than the threshold value at a starting point of a frame is called 'mis-detection' and a probability that a correlation value is larger than the threshold value in a section other than a starting point in a frame is called 'false-alarm,' the ROC is a curve obtained by analyzing the mis-detection probability and false-alarm rate.

In the Equation 1, N denotes length of a symbol sequence used in the correlation analysis and $Z_m$ denotes the $m^{th}$ reception symbol while $b_m$ denotes the $m^{th}$ symbol of a symbol sequence indicating the starting point of a frame, which will be referred to as a sync word hereinafter.

$$c_{general} = \left|\sum_{m=0}^{N-1} z_m^* b_m\right|^2 \bigg/ \left(N \times \sum_{m=0}^{N-1} |z_m|^2\right)$$ Eq. 1

When there is a frequency error $f_0$, phase rotation corresponding to $2\pi f_0/R_s$ (where $R_s$ is a bandwidth) occurs on a symbol basis and the longer the distance between symbols is, the larger the phase difference becomes. Thus, a satellite communication system with a large frequency error has limitation in acquiring highly reliable ROC in the correlation analysis as shown in the Equation 1 due to the large phase error between adjacent symbols and a low signal-to-noise ratio. This leads to a conclusion that with existing frame synchronization methods cannot provide frame synchronization performance recently required by the satellite communication system to provide services.

The present invention takes the distortion of a correlation analysis value based on a frequency error into account and analyzes correlation by using differentiation information between adjacent symbols as shown in Equation 2.

In the Equation 2, N denotes length of a symbol sequence used in the correlation analysis and $z_m$ denotes the $m^{th}$ reception symbol, while $r_m = z_m z_{m+1}$ and denotes differentiation information between adjacent reception symbols, which will be referred to as 'reception differentiation information,' hereinafter. When the $m^{th}$ symbol of a sync word is $b_m$, $s_m = b_m b_{m+1}$ and it indicates differentiation information between adjacent sync word symbols, which will be referred to as 'reference differentiation information.' Herein, denotes a correlation value based on the differentiation information.

$$c_{diff} = \left|\sum_{m=0}^{N-2} r_m^* s_m\right|^2 \bigg/ \left((N-1) \times \sum_{m=0}^{N-2} |r_m|^2\right)$$ Eq. 2

A frame structure to which the present invention is applied includes a symbol sequence indicating the starting point of a frame, i.e., a sync word 101, and pilot blocks 103 added to each data field 102 of a predetermined length.

Since it can be assumed that a pilot block 103 is a training symbol sequence used for channel estimation and frequency estimation and a receiving end has already acquired information on the pattern and location of the pilot block 103, the pilot block 103 can be used together with the sync word 101. This makes it possible to perform correlation analysis based on differentiation information.

Also, since more than one pilot block 103 is added to one frame generally, it is possible to perform multi-step correlation analysis and threshold test by using the pilot block 103.

Figure 2:
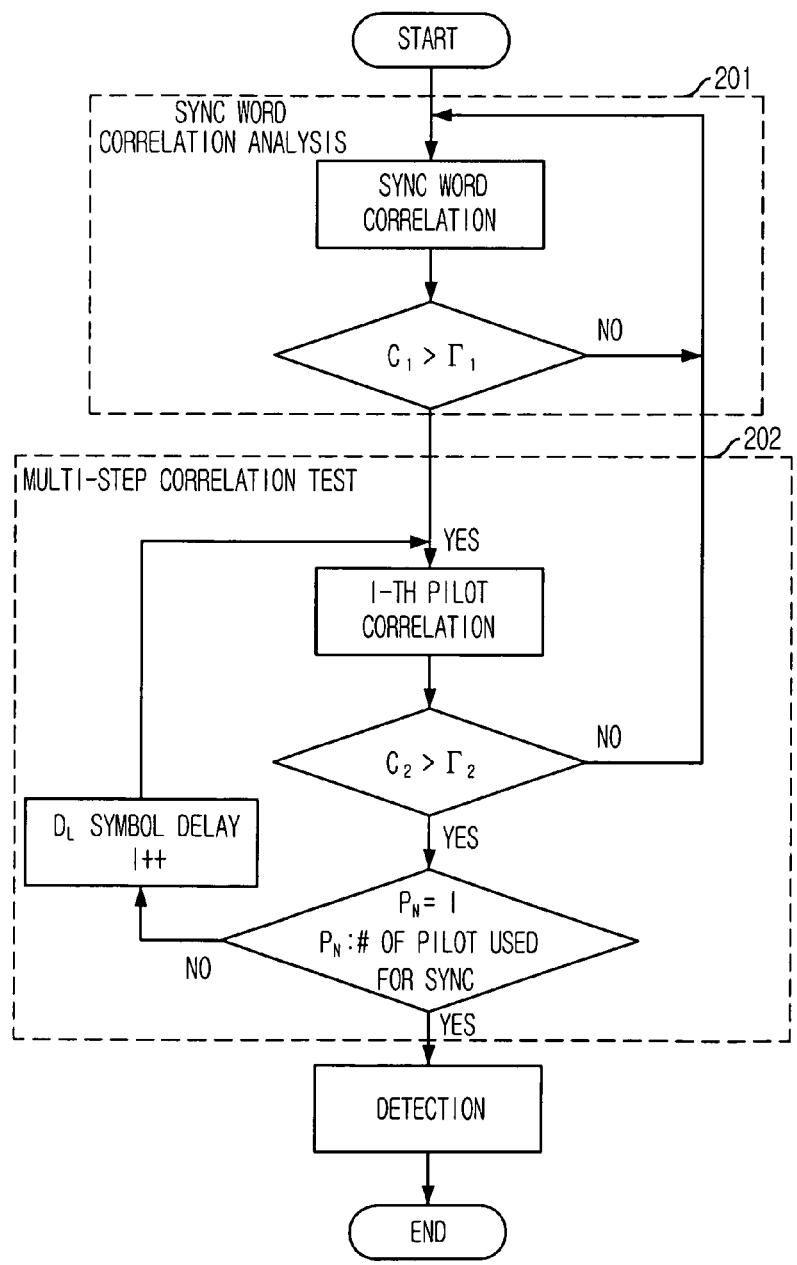
FIG. 2 is a flowchart describing a frame synchronization method in accordance with an embodiment of the present invention.

FIG. 2 is a flowchart describing a frame synchronization method in accordance with an embodiment of the present invention. It describes the multi-step threshold value test based on the frame structure where pilot blocks 103 are added.

As shown in FIG. 1, to perform communication appropriately in a burst-mode satellite communication system with pilot blocks added to data fields, it is necessary to perform frame synchronization in the receiving end to determine the starting point of a frame. Generally, performance of frame synchronization process executed right after symbol synchronization in the initial synchronization mode is an essential parameter that becomes a basic assumption for acquiring performance required by the entire system.

The frame synchronization method suggested in the present invention includes correlation analysis of a sync word, which is a symbol sequence notifying the starting of a frame, based on differentiation information between adjacent symbols to overcome the frequency error in the initial synchronization and a multi-step threshold value test by using pilot blocks to enhance estimation reliability.

According to the present invention shown in FIG. 2, frames are synchronized through two steps. In step S201, a correlation analysis based on a sync word and a threshold test is carried out. Then, in step S202, a multi-step correlation test is performed by using pilot blocks added to data fields prior the sync word to thereby increase the reliability of a frame synchronization estimation value.

In the drawing, $c_1$ denotes a correlation value of a sync word obtained from the Equation 2 based on reception differentiation information and reference differentiation information of a sync word, and $\Gamma_1$ is a threshold value for sync word correlation test.

Also, $c_2$ denotes a correlation value of a pilot block obtained from the Equation 2 based on reception differentiation information and reference differentiation information of a pilot block, and $\Gamma_2$ is a threshold value for the multi-step threshold value test using a pilot block. A parameter $D_L$ is length of a data field between adjacent pilot blocks in the frame structure shown in FIG. 1 and $P_L$ is length of a pilot block, while $P_N$ denotes the number of pilot blocks used for the frame synchronization.

In the multi-step correlation analysis, it is possible to increase the reliability of a frame synchronization estimation value, because the mis-detection probability (MDP) increases as shown in Equation 3 while the false-alarm rate (FAR) decreases as shown in Equation 4.

$$q = far_{sync.signal}(far_{pilot})^{PN}$$ Eq. 3

$$p = 1 - (1 - mdp_{sync\ signal})(1 - mdp_{pilot})^{PN}$$ Eq. 4

In the Equation 4, when the MDP of a correlation analysis value of a sync word obtained based on the Equation 2 is $mdp_{sync\ signal}$ and the MDP of a correlation analysis value using 11 pilot blocks is $mdp_{pilot}$, the p of the Equation 4 denotes the MDP of the entire frame synchronization process suggested in FIG. 2. Also, when the FAR of a correlation analysis value of a sync word obtained based on the Equation 2 is $far_{sync\ signal}$ and the FAR of a correlation analysis value using one pilot block is $far_{pilot}$, the q of the Equation 3 denotes the FAR of the entire frame synchronization process suggested in FIG. 2.

Also, $P_N$ denotes the number of pilot blocks used in the frame synchronization and it can be determined flexibly according to the required frame performance and frame structure.

The MDP is a significant parameter for determining frame synchronization acquisition time and the FAR is a significant parameter for determining the reliability of a frame synchronization estimation value. Thus, parameters such as a threshold value of each step and the number of used parameters needs to be optimized according to the required frame synchronization acquisition time and a frame synchronization reliability.

To analyze the performance of the frame synchronization method suggested in the present invention, a frame synchronization error rate is defined as follows by using the entire FAR(q) and MDP(p) that can be obtained by analyzing the MDP and FAR of each step.

First, since no false-alarm is supposed to occur in a position which is not the starting point of a frame and no mis-detection is supposed to occur in the starting point of a frame, a frame synchronization success probability $P^{(1)}_{SUCC}$ of a single frame can be calculated as shown in Equation 5.

$$P^{(1)}_{SUCC} = \frac{1}{N_S}[(1-p) + (1-p)(1-q) + \qquad \text{Eq. 5}$$
$$(1-p)(1-q)^2 + \cdots + (1-p)(1-q)^{N_S-1}]$$
$$= \frac{(1-p)(1-(1-q)^{N_S})}{qN_S}$$

where Ns is the number of symbols in a frame.

When the Equation 5 is extended from one single frame to $N_F$ frames, the frame synchronization success probability $P^{(N_F)}_{SUCC}$ of $N_F$ frames can be calculated as shown in Equation 6.

$$P^{(N_F)}_{SUCC} = P^{(1)}_{succ} + P^{(1)}_{succ}p(1-q)^{N_S-1} + \cdots + \qquad \text{Eq. 6}$$
$$P^{(1)}_{succ}(p(1-q)^{N_S-1})^{N_F-1}$$
$$= P^{(1)}_{succ}\left(\frac{1-(p(1-q)^{N_S-1})^{N_F}}{1-p(1-q)^{N_S-1}}\right)$$
$$= \frac{(1-p)(1-(1-q)^{N_S})}{qN_S}\left(\frac{1-(p(1-q)^{N_S-1})^{N_F}}{1-p(1-q)^{N_S-1}}\right)$$

When $P_{SUCC}^{(N_F)} = P_{SUCC}^{(\infty)}$, the frame synchronization success probability can be approximately calculated as Equation 7 by using the Taylor's approximation where $x \ll 1 \to (1-x)^c \cong 1-cx$.

$$P^{(\infty)}_{SUCC} \cong \frac{(1-p)(1-(1-qN_S))}{qN_S(1-p(1-qN_S))} \qquad \text{Eq. 7}$$
$$= \frac{1-p}{1-p(1-qN_S)}$$
$$= \frac{1-p}{1-p+pqN_S}$$

Therefore, the frame synchronization error rate, which means a probability that the frame synchronization is failed in $N_F$ frames, can be presented as Equation 8. After a long time ($N_F = \infty$), the frame synchronization error rate can be approximately calculated as shown in Equation 9.

$$P_{Error}^{(N_F)} = 1 - P_{SUCC}^{(N_F)} \qquad \text{Eq. 8}$$

$$P_{Error}^{(\infty)} = 1 - P_{SUCC}^{(\infty)} \qquad \text{Eq. 9}$$

Meanwhile, the performance analysis was applied to a Digital Video Broadcasting Satellite version 2 (DVB-S2) system and a simulation environment was as follows.

The used channel was an Additive White Gaussian Noise (AWGN) channel having a signal-to-noise ratio of $E_s/N_0 = -2.35$ dB, the bandwidth was 25 MHz and the frequency error a phase error were uniformly distributed in sections [−5 MHz, 5 MHz] and [−p,p].

Figure 3:
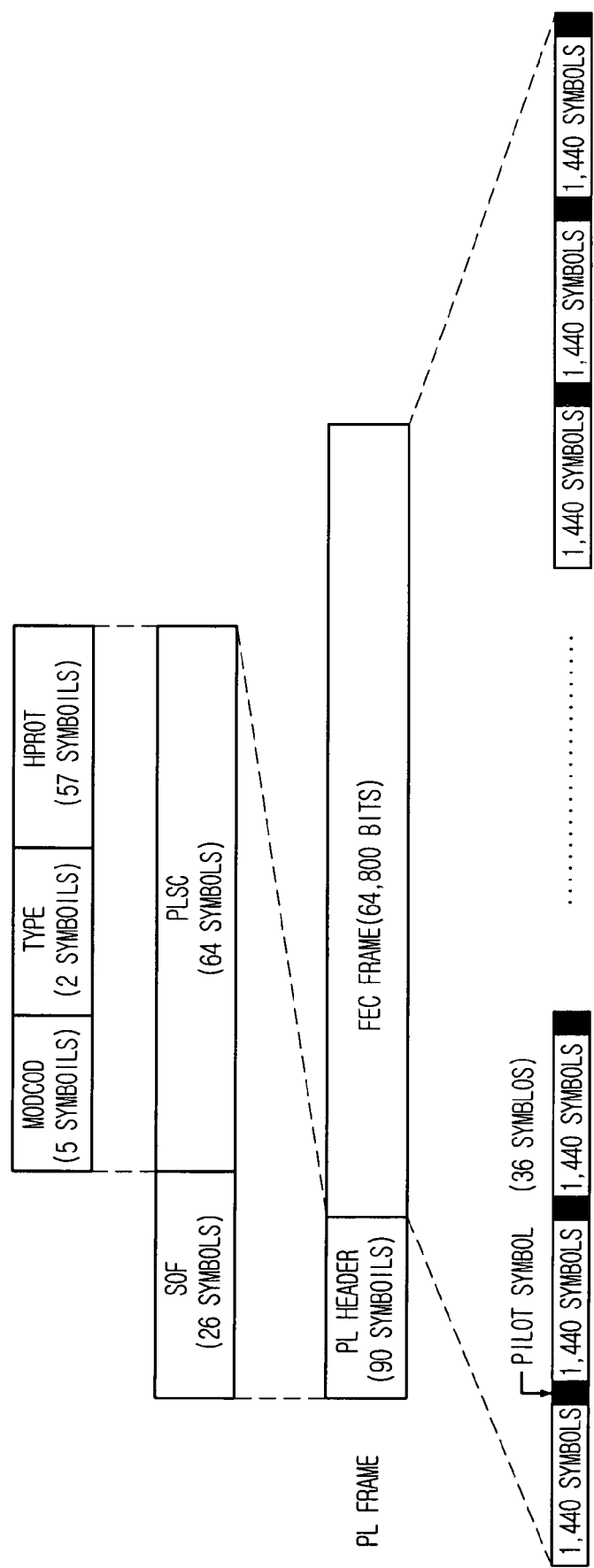
FIG. 3 is a diagram showing a frame structure of a Digital Video Broadcasting Satellite version 2 (DVB-S2) system.

FIG. 3 is a diagram showing a frame structure of a Digital Video Broadcasting Satellite version 2 (DVB-S2) system. The drawing is presented to verify the performance of the present invention.

The frame structure includes a Start of Frame (SOF) indicating the starting of a frame, which is a sync word of the DVB-S2 system, a PL header which is formed of Physical Layer Signaling Codes (PLSC) having information on the transmission format of the adaptive broadcasting system, and a Forward Error Correction (FEC) frame in which a pilot block is added every 1,440 data symbols. The SOF is formed of 26 symbol sequences, and each pilot block is formed of 36 un-modulated symbols.

The structure of DVB-S2 frame, which is used to verify the performance of the present invention, adopts Quadrature Phase Shift Keying (QPSK) modulation, long frames of 64,800 bits/frame, and pilot blocks added thereto. Actual DVB-S2 systems are adaptive satellite broadcasting systems and they support QPSK, 8PSK, 16APSK, and 32APSK modulations and coding rates ranging from ¼ to 9/10 according to a channel environment and the quantity of transmission data. They also support a long frame mode of 64,800 bits/frame and a short frame mode of 12,400 bits/frame. Also, since they support both a case with pilot blocks added and a case without pilot blocks, the frame structure is quite variable.

The simulation is carried out to produce the ROC of each step.

Figure 4:
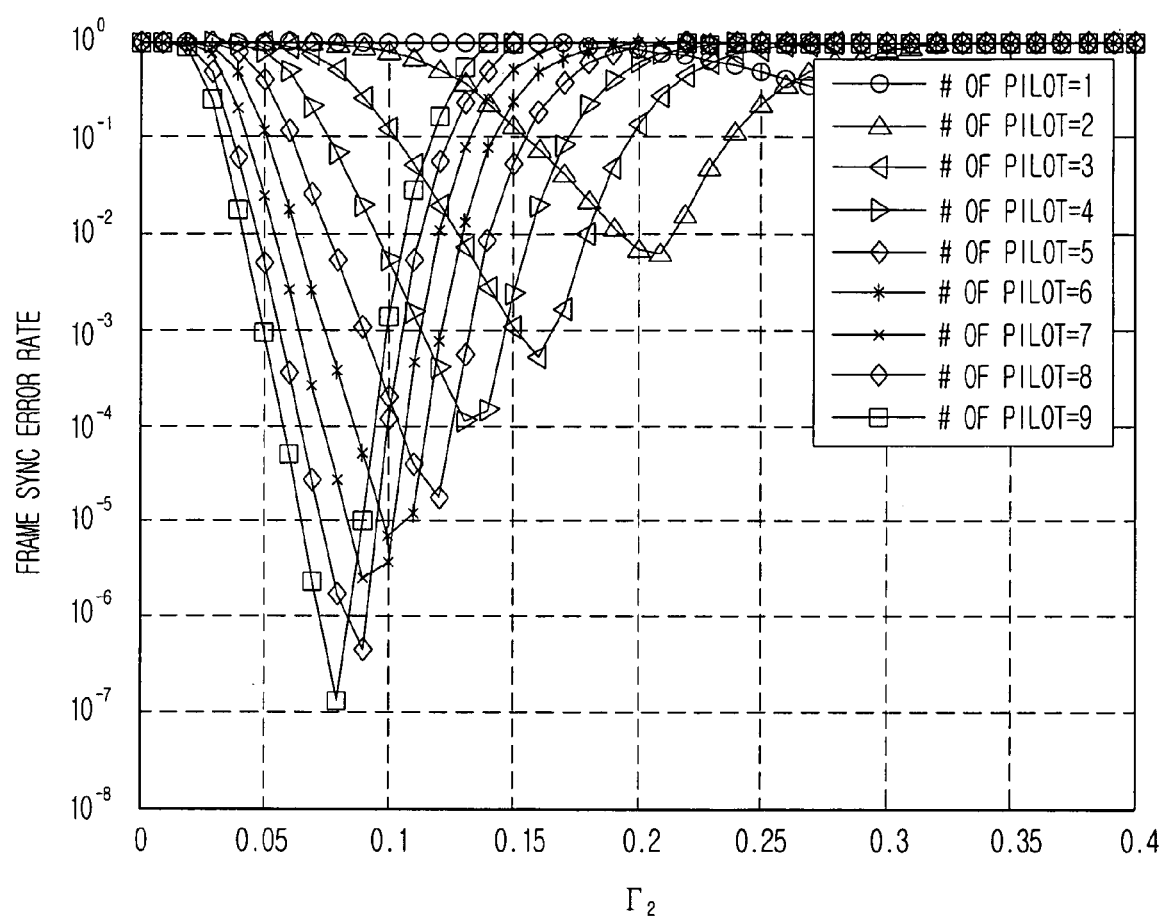
FIGS. 4 and 5 are graphs showing frame synchronization error rates when a frame synchronization method of the present invention is used.
Figure 5:
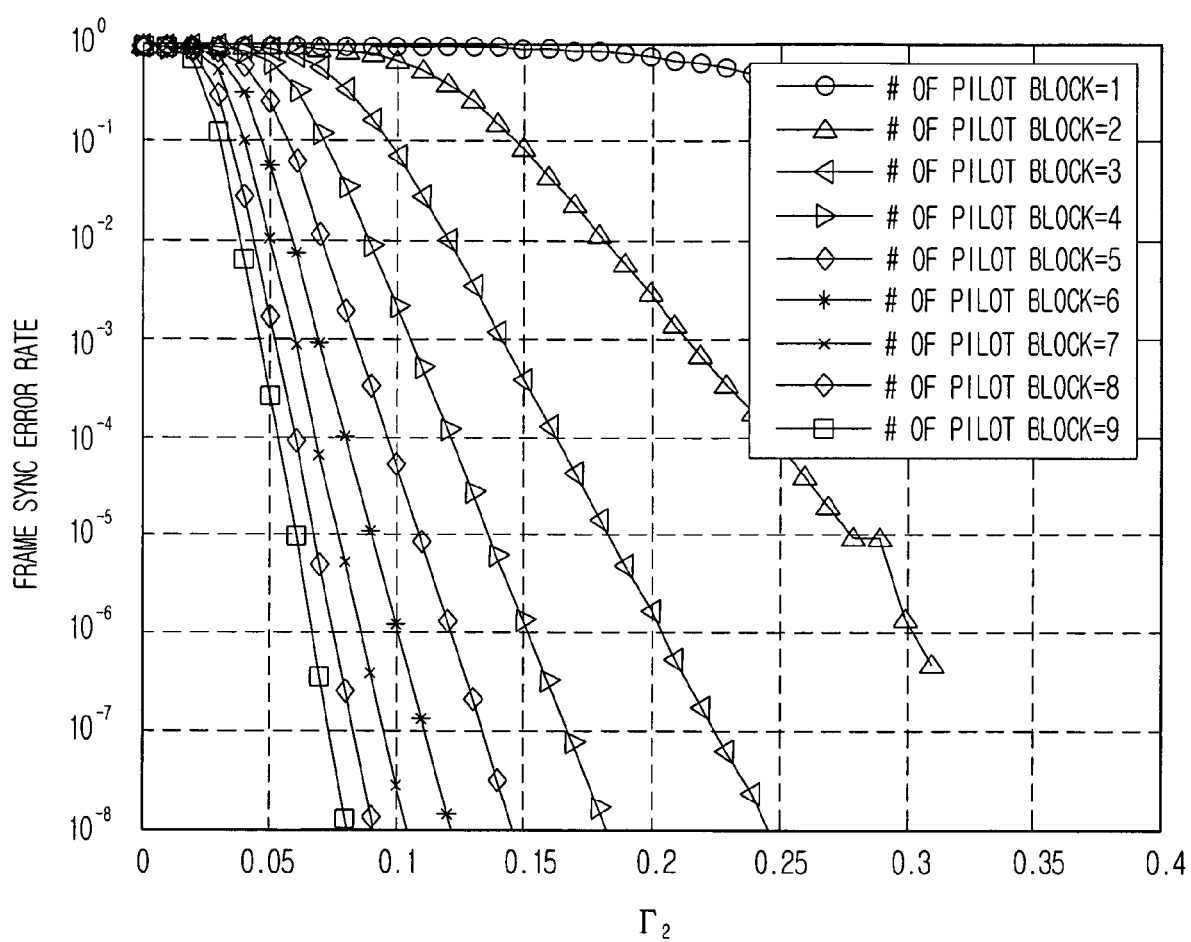

FIGS. 4 and 5 are graphs showing frame synchronization error rates when a frame synchronization method of the present invention is used. The graphs show the number $P_N$ of used pilot blocks when $\Gamma_1$ is fixed at 0.1 and analysis values obtained from the Equation 8 according to variations of $\Gamma_2$, when the required frame synchronization acquisition time is not more than 200 ms where $N_F = 150$.

As seen from FIG. 5, when 9 pilot blocks are used for frame synchronization, it is possible to acquire a frame synchronization estimation value having a high reliability of about $10^{-7}$ within 200 ms in the respect of frame synchronization error rate, despite the low signal-to-noise ratio ($E_s/N_0 = -2.35$ dB) and the large frequency error which occupies 20% of the entire bandwidth.

When $\Gamma_2$ increases, q decreases and thus the reliability of a frame synchronization estimation value increases. However, since p decreases herein, the probability that a frame synchronization alarm signal for information frame synchronization within a required frame synchronization acquisition time is generated falls down, a minimum point is generated in the respect of frame synchronization performance, which is shown in FIG. 4. However, when the required frame synchronization acquisition time is sufficiently long ($N_F = \infty$), that is, when analysis of Equation 9 is carried out, the frame synchronization error rate performance increases as $\Gamma_2$ increases, which is shown in FIG. 5. Therefore, the lower limit of the frame synchronization error rate that can be acquired in accordance with each parameter in the present invention can be analyzed based on the Equation 9. The frame synchronization time and parameter-based frame synchronization error rate can be analyzed based on the Equation 8.

Therefore, the present invention can be applied to all communication systems satisfying the frame structure of FIG. 1, and it can be used flexibly in consideration of the required frame synchronization time ($N_F$), the number ($P_N$) of available pilot blocks, and the required reliability (q) of a frame synchronization alarm signal.

The method of the present invention can be realized as a program and stored in a computer-readable recording medium such as CD-ROM, RAM, ROM, floppy disks, hard disks, and magneto-optical disks. Since this process can be easily implemented by those skilled in the art of the present invention, detailed description on it will not be provided herein.

The present application contains subject matter related to Korean patent application No. 2005-121172, filed in the Korean Intellectual Property Office on Dec. 9, 2005, the entire contents of which is incorporated herein by reference.

Since the technology of the present invention can acquire a highly reliable frame synchronization estimation value in a satellite communication system operating with a low signal-to-noise ratio and a large frequency error, it can provide high-quality services and provide higher frame synchronization performance than existing frame synchronization technologies.

The present application contains subject matter related to Korean patent application No. 2005-121172, filed in the Korean Intellectual Property Office on Dec. 9, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for synchronizing frames with pilot blocks added thereto based on differential correlation information in a satellite communication system, comprising:
   performing correlation analysis and a threshold test by using a sync word;
   performing a multi-step correlation threshold value test by using the pilot blocks added to the frames prior to the sync word; and
   analyzing a correlation value of one pilot block obtained from an equation based on reception differentiation information and reference differentiation information of a pilot block and a threshold value for the multi-step correlation threshold value test using the pilot blocks.

2. The method as recited in claim 1, wherein a sync word correlation value is examined and the threshold value is examined when the sync word correlation value is examined, the sync word correlation value being calculated based on the equation that is expressed as:

$$c_{diff} = \left|\sum_{m=0}^{N-2} r_m^* s_m\right|^2 \Big/ \left((N-1) \times \sum_{m=0}^{N-2} |r_m|^2\right)$$

where N denotes length of a symbol sequence used for the correlation analysis;
$z_m$ denotes the $m^{th}$ reception symbol;
$r_m = z^*_m z_{m+1}$ and $r_m$ denotes differentiation information between adjacent reception symbols, which is referred to as reception differentiation information;
$b_m$ denotes the $m^{th}$ symbol of the sync word;
$s_m = b^*_m b_{m+1}$ and $s_m$ denotes differentiation information between adjacent sync word symbols, which is referred to as reference differentiation information; and
$c_{diff}$ denotes a correlation value based on the reception differentiation information and the reference differentiation information.

3. The method as recited in claim 1, wherein reliability of frame synchronization estimation value increases while a false alarm rate decreases.

4. An apparatus comprising a computer-readable medium containing instructions which, when executed cause a computer to:
   perform correlation analysis and a threshold test by using a sync word;
   perform a multi-step correlation threshold value test by using pilot blocks added to frames prior to the sync word; and
   analyze a correlation value of one pilot block obtained from an equation based on reception differentiation information and reference differentiation information of a pilot block and a threshold value for the multi-step correlation threshold value test using the pilot blocks, wherein the frames are synchronized with the pilot blocks added thereto based on the differential correlation information in a satellite communication system.

5. The apparatus as recited in claim 4, wherein a sync word correlation value is examined and the threshold value is examined when the sync word correlation value is examined, the sync word correlation value being calculated based on the equation that is expressed as:

$$C_{diff} = \left|\sum_{m=0}^{N-2} r_m^* s_m\right|^2 \Big/ \left((N-1)x\sum_{m=0}^{N-2} |r_m|^2\right)$$

where N denotes length of a symbol sequence used for the correlation analysis;
$z_m$ denotes the $m^{th}$ reception symbol;
$r_m = z_m z^*_{m+1}$ and $r_m$ denotes differentiation information between adjacent reception symbols, which is referred to as reception differentiation information;
$b_m$ denotes the $m^{th}$ symbol of the sync word;
$s_m = b_m b^*_{m+1}$ and $s_m$ denotes differentiation information between adjacent sync word symbols, which is referred to as reference differentiation information; and
$c_{diff}$ denotes a correlation value based on the reception differentiation information and the reference differentiation information.

6. The apparatus as recited in claim 4, wherein reliability of frame synchronization estimation value increases while a false alarm rate decreases.

* * * * *